US010347047B2

(12) United States Patent
Poursohi et al.

(10) Patent No.: US 10,347,047 B2
(45) Date of Patent: Jul. 9, 2019

(54) TRIGGER REGIONS

(71) Applicant: Google LLC, Mountain View, CA (US)

(72) Inventors: Arshan Poursohi, San Francisco, CA (US); Daniel Aden, San Francisco, CA (US); Matthew Amacker, San Francisco, CA (US); Charles Robert Barker, San Francisco, CA (US); Paul Vincent Byrne, San Francisco, CA (US); Paul Du Bois, San Francisco, CA (US); Greg Joseph Klein, San Francisco, CA (US); Steve Scott Tompkins, San Francisco, CA (US)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 15/213,843

(22) Filed: Jul. 19, 2016

(65) Prior Publication Data
US 2017/0148217 A1 May 25, 2017

Related U.S. Application Data

(60) Provisional application No. 62/259,971, filed on Nov. 25, 2015.

(51) Int. Cl.
*G06T 15/00* (2011.01)
*G06T 19/00* (2011.01)
(Continued)

(52) U.S. Cl.
CPC ........ *G06T 19/006* (2013.01); *G06K 9/00771* (2013.01); *G06K 9/2081* (2013.01)

(58) Field of Classification Search
CPC ..... G06T 19/006; G06F 3/011; G06K 9/2081; G06K 9/00771
(Continued)

(56) References Cited

U.S. PATENT DOCUMENTS 6,567,787 B1    5/2003  Walker
7,453,471 B2 * 11/2008  Fukui ................... G03B 15/00
                                                    345/629
(Continued)

FOREIGN PATENT DOCUMENTS

JP    2014164537 A2    9/2014
KR    1020140054650 A  9/2014

OTHER PUBLICATIONS

Wu, Bing-Fei, Hsin-Yuan Peng, and Chao-Jung Chen. "A practical home security system via mobile phones." WSEAS Transactions on Communications 5, No. 6 (2006): 1061-1066.*
(Continued)

*Primary Examiner* — Phu K Nguyen
(74) *Attorney, Agent, or Firm* — McDonnell Boehnen Hulbert & Berghoff LLP

(57) ABSTRACT

Example implementations may relate to methods and systems for detecting an event in a physical region within a physical space. Accordingly, a computing system may receive from a subscriber device an indication of a virtual region within a virtual representation of the physical space such that the virtual region corresponds to the physical region. The system may also receive from the subscriber a trigger condition associated with the virtual region, where the trigger condition corresponds to a particular physical change in the physical region. The system may also receive sensor data from sensors in the physical space and a portion of the sensor data may be associated with the physical region. Based on the sensor data, the system may detect an event in the physical region that satisfies the trigger condition and may responsively provide to the subscriber a notification that indicates that the trigger condition has been satisfied.

22 Claims, 11 Drawing Sheets

(51) Int. Cl.
*G06K 9/00* (2006.01)
*G06K 9/20* (2006.01)

(58) Field of Classification Search
USPC .......................................................... 345/419
See application file for complete search history.

(56) References Cited

U.S. PATENT DOCUMENTS

| | | | |
|---|---|---|---|
| 7,987,111 B1 | 7/2011 | Sharma | |
| 8,189,926 B2 | 5/2012 | Sharma | |
| 8,803,917 B2* | 8/2014 | Meehan | G06T 19/006 |
| | | | 345/633 |
| 8,965,042 B2 | 2/2015 | Borger | |
| 8,994,645 B1* | 3/2015 | Meehan | H04W 4/02 |
| | | | 345/156 |
| 9,311,795 B2* | 4/2016 | Lyman | G08B 13/19695 |
| 9,626,440 B2* | 4/2017 | Meyerzon | G06F 17/30864 |
| 9,953,512 B2* | 4/2018 | Lyman | G08B 25/10 |
| 9,978,238 B2* | 5/2018 | Fadell | G08B 19/005 |
| 2009/0033622 A1 | 2/2009 | Kalpaxis | |
| 2012/0312956 A1 | 12/2012 | Chang | |
| 2014/0157206 A1 | 6/2014 | Ovsiannikov | |
| 2014/0168062 A1 | 6/2014 | Affias | |
| 2015/0020031 A1 | 1/2015 | El Dokor | |

OTHER PUBLICATIONS

Assaf MH, Mootoo R, Das SR, Petriu EM, Groza V, Biswas S. Sensor based home automation and security system. InInstrumentation and Measurement Technology Conference (I2MTC), 2012 IEEE International May 13, 2012 (pp. 722-727). IEEE.*

Yang, Lili, Shuang-Hua Yang, and Fang Yao. "Safety and security of remote monitoring and control of intelligent home environments." (2006).*

Zhang J, Song G, Qiao G, Meng T, Sun H. An indoor security system with a jumping robot as the surveillance terminal. IEEE Transactions on Consumer Electronics. Nov. 2011;57(4).*

Goldszmidt G, Yemini Y. Distributed management by delegation. InDistributed Computing Systems, 1995., Proceedings of the 15th International Conference on May 30, 1995 (pp. 333-340). IEEE.*

Goldszmidt, German, Yechiam Yemini, and Shaula Yemini. "Network management by delegation: the MAD approach." in CASCON First Decade High Impact Papers, pp. 78-92. IBM Corp., 2010.*

Gavalas D, Greenwood D, Ghanbari M, O'Mahony M. Hierarchical network management: a scalable and dynamic mobile agent-based approach. Computer Networks. Apr 22, 2002;38(6):693-711.*

Monitoring, Remote Network. "Network Working Group S. Waldbusser Request for Comments: 4502 May 2006 Obsoletes: 2021 Updates: 3273 Category: Standards Track." (2006).*

International Search Report for corresponding PCT application No. PCT/US2016/063364, dated Mar. 20, 2017.

Written Opinion for corresponding PCT application No. PCT/US2016/063364, dated Mar. 20, 2017.

* cited by examiner

TRIGGER REGIONS

CROSS REFERENCE TO RELATED APPLICATION

The present application claims priority to U.S. Provisional patent application Ser. No. 62/259,971 filed on Nov. 25, 2015 and entitled "Trigger Regions," the entire contents of which are herein incorporated by reference.

BACKGROUND

Physical spaces may be used for retail, manufacturing, assembly, distribution, and office spaces, among others. Over time, the manner in which these physical spaces are designed and operated is becoming more intelligent, more efficient, and more intuitive. As technology becomes increasingly prevalent in numerous aspects of modern life, the use of technology to enhance these physical spaces becomes apparent. Therefore, a demand for such systems has helped open up a field of innovation in sensing techniques, data processing, as well as software and user interface design.

SUMMARY

Example implementations may relate to a computing system that can receive a request from a subscriber device. This request may define a virtual region that corresponds to a physical region within a physical space and may also define a trigger condition corresponding to a particular physical change within the physical region. The computing system may receive sensor data from sensors in the physical space and may the use the sensor data as a basis to detect an event that corresponds to the particular physical change in the physical region. The computing system may interpret detection of this event as the trigger condition being satisfied and may then notify the subscriber device that the trigger condition has been satisfied.

In one aspect, a method is provided. The method involves receiving, by a computing system from at least one subscriber device, an indication of at least one virtual region within a virtual representation of a physical space, where the at least one virtual region corresponds to at least one physical region within the physical space. The method also involves receiving, by the computing system from the at least one subscriber device, at least one trigger condition associated with the at least one virtual region, where the at least one trigger condition corresponds to at least one particular physical change in the at least one physical region. The method additionally involves receiving, by the computing system, sensor data from a plurality of sensors positioned in the physical space, where at least a portion of the sensor data is associated with the at least one physical region within the physical space. The method further involves, based on the sensor data, the computing system detecting an event in the at least one physical region that satisfies the at least one trigger condition corresponding to the at least one particular physical change in the at least one physical region. The method yet further involves, in response to detecting the event, providing, by the computing system to the at least one subscriber device, a notification that indicates that the at least one trigger condition has been satisfied.

In another aspect, a computing system is provided. The computing system includes one or more processors. The computing system also includes a non-transitory computer readable medium. The computing system further includes program instructions stored on the non-transitory computer readable medium and executable by the one or more processors to receive, from at least one subscriber device, an indication of at least one virtual region within a virtual representation of a physical space, where the at least one virtual region corresponds to at least one physical region within the physical space. The program instructions are also executable to receive, from the at least one subscriber device, at least one trigger condition associated with the at least one virtual region, where the at least one trigger condition corresponds to at least one particular physical change in the at least one physical region. The program instructions are additionally executable to receive sensor data from a plurality of sensors positioned in the physical space, where at least a portion of the sensor data is associated with the at least one physical region within the physical space. The program instructions are further executable to, based on the sensor data, detect an event in the at least one physical region that satisfies the at least one trigger condition corresponding to the at least one particular physical change in the at least one physical region. The program instructions are yet further executable to, in response to detecting the event, provide, to the at least one subscriber device, a notification that indicates that the at least one trigger condition has been satisfied.

In yet another aspect, a non-transitory computer readable medium is provided. The non-transitory computer readable medium has stored therein instructions executable by one or more processors to cause a computing system to perform functions. The functions include receiving, from at least one subscriber device, an indication of at least one virtual region within a virtual representation of a physical space, where the at least one virtual region corresponds to at least one physical region within the physical space. The functions also include receiving, from the at least one subscriber device, at least one trigger condition associated with the at least one virtual region, where the at least one trigger condition corresponds to at least one particular physical change in the at least one physical region. The functions additionally include receiving sensor data from a plurality of sensors positioned in the physical space, where at least a portion of the sensor data is associated with the at least one physical region within the physical space. The functions further include, based on the sensor data, detecting an event in the at least one physical region that satisfies the at least one trigger condition corresponding to the at least one particular physical change in the at least one physical region. The functions yet further include, in response to detecting the event, providing, to the at least one subscriber device, a notification that indicates that the at least one trigger condition has been satisfied.

In yet another aspect, a system is provided. The system may include means for receiving, from at least one subscriber device, an indication of at least one virtual region within a virtual representation of a physical space, where the at least one virtual region corresponds to at least one physical region within the physical space. The system may also include means for receiving, from the at least one subscriber device, at least one trigger condition associated with the at least one virtual region, where the at least one trigger condition corresponds to at least one particular physical change in the at least one physical region. The system may additionally include means for receiving sensor data from a plurality of sensors positioned in the physical space, where at least a portion of the sensor data is associated with the at least one physical region within the physical space. The system may further include means for, based on the sensor data, detecting an event in the at least one physical region that satisfies the at least one trigger condition corresponding to the at least one particular physical change in the at least one physical region. The system may yet further include means for, in response to detecting the event, providing, to the at least one subscriber device, a notification that indicates that the at least one trigger condition has been satisfied.

These as well as other aspects, advantages, and alternatives will become apparent to those of ordinary skill in the art by reading the following detailed description, with reference where appropriate to the accompanying drawings.

DETAILED DESCRIPTION

Figure 1:
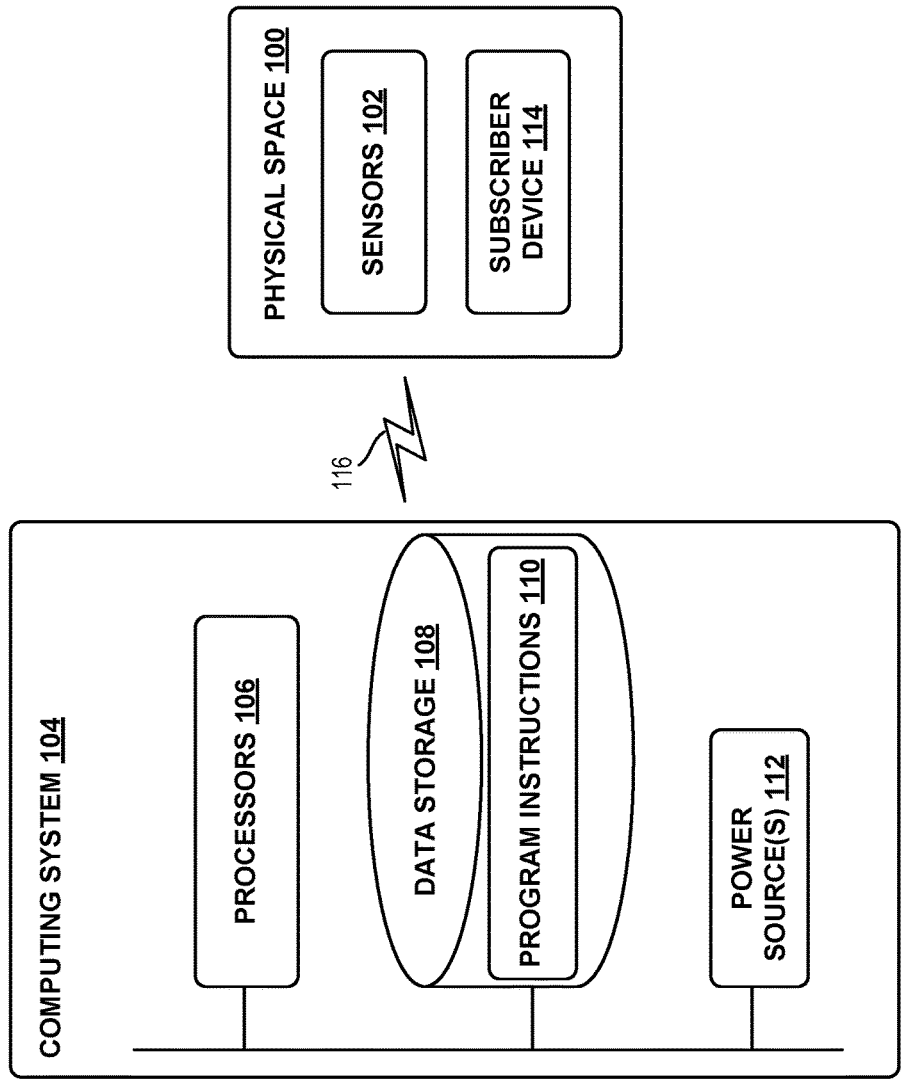
FIG. 1 illustrates an example configuration of system for detecting an event in a physical region of a physical space, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for detecting that a trigger condition has been satisfied within a physical region of a physical space. In particular, the disclosed system may allow a subscriber device (e.g., a consumer electronic device) to request for the system to notify the subscriber device when a particular physical change takes place within a specified region of the physical space. In accordance with the disclosure, the subscriber device can transmit to the system a request that specifies a virtual region that corresponds to a physical region within the physical space. This request may also specify a trigger condition related to the virtual region such that the trigger condition corresponds to a particular physical change within the specified physical region. For instance, the trigger condition may involve entry of an actor (e.g., a robot) into the specified physical region. As such, this request may essentially subscribe the subscriber device to the services provided by the disclosed system.

Additionally, the disclosed system may communicate with various sensors positioned in the physical space. The various sensors may provide data about physical entities in the physical space as well as data about events taking place within the physical space, among other types of data. The system may receive such data and may process the data to detect an event in the data that indicates that the trigger condition has been satisfied. In particular, this may involve the computing system determining a portion of the sensor data that is associated with the physical region and then interpreting the data to determine that the particular physical change has taken place within the physical region.

Once the system determines that the particular physical change has taken place within the physical region, the system could notify the subscriber device that the trigger condition has been satisfied. When receiving such a notification, the subscriber device could take one of various actions. For instance, the subscriber device may be a television that defines the region as being a three-dimensional cylindrical region around the television and the trigger condition as being entry of a person into the defined region. In this instance, the television may receive from the disclosed system a notification indicating that the trigger condition has been satisfied (and thus that a person entered the region) and the television may turn on in response to receiving this notification.

In this manner, the disclosed system essentially provides for a programming building block for subscriber devices. More specifically, a subscriber device may not have any information about the sensors in the physical space and/or may not have the capability to determine how to use such sensors to detect physical changes of interest within the physical space. Thus, rather than programming a subscriber device to include such capabilities, the disclosed system would increase the ease of programming by allowing a subscriber device to specify the region and to specify the trigger condition.

Once the disclosed system receives the request specifying the region and the trigger condition, the disclosed system may essentially act as a programming building block by gaining information about the sensors in the physical space and then determining how to use such sensors to detect physical changes of interest within the physical region of the physical space. Subsequently, the subscriber device could be notified by the disclosed system when a physical change of interest within the physical region has taken place and thus when the trigger condition has been satisfied. Therefore, this disclosed system may reduce the extent of programming needed for the subscriber device to obtain information of interest about a physical space. Moreover, this disclosed system could communicate with a plurality of subscriber devices simultaneously, thereby allowing the disclosed system to simultaneously provide the above-mentioned services to many subscriber devices.

II. ILLUSTRATIVE SYSTEMS

Referring now to the figures, FIG. 1 shows an example arrangement including a physical space 100 having one or more sensors 102. A physical space may define a portion of an environment in which people, objects, and/or machines may be located. The physical space may take on a two-dimensional or a three-dimensional (3D) form and may be used for various purposes. For instance, the physical space may be used as a retail space where the sale of goods and/or services is carried out between individuals (or businesses) and consumers. Other instances may involve physical spaces such as manufacturing facilities, distribution facilities, office spaces, shopping centers, festival grounds, and/or airports, among other examples. Additionally, while a single physical space 100 is shown in FIG. 1, example implementations may be carried out in the context of a plurality of physical spaces. In a further aspect, one or more actors may be positioned within the physical space 100. In particular, the actors may define one of various physical entities located within the physical space 100. For instance, actors may include people, animals, machines, robotic systems, and/or objects, among other possibilities.

Example sensors 102 in a physical space may include but are not limited to: force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

Additionally, the sensors 102 may be positioned within or in the vicinity of the physical space 100, among other possible locations. Further, an example implementation may also use sensors incorporated within existing devices such as mobile phones, laptops, and/or tablets. These devices may be in possession of people located in the physical space 100 such as consumers and/or employees within a retail space. Additionally or alternatively, these devices may be items on display, such as in a retail space used for sale of consumer electronics for example.

FIG. 1 also depicts a computing system 104 that may receive data from the sensors 102 positioned in the physical space 100. In particular, the sensors 102 may provide sensor data to computing system via a communication link 116. Communication link 116 may include a wired link and/or a wireless link (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the sensors 102 and/or computing system 104 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Computing system 104 is shown to include one or more processors 106, data storage 108, program instructions 110, and power source(s) 112. Note that the computing system 104 is shown for illustration purposes only as computing system 104 may include additional components and/or have one or more components removed without departing from the scope of the disclosure. Further, note that the various components of computing system 104 may be arranged and connected in any manner.

Each processor, from the one or more processors 106, may be a general-purpose processor or a special purpose processor (e.g., digital signal processors, application specific integrated circuits, etc.). The processors 106 can be configured to execute computer-readable program instructions 110 that are stored in the data storage 108 and are executable to provide the functionality of the computing system 104 described herein. For instance, the program instructions 110 may be executable to provide for processing of sensor data received from sensors 102.

The data storage 108 may include or take the form of one or more computer-readable storage media that can be read or accessed by the one or more processors 106. The one or more computer-readable storage media can include volatile and/or non-volatile storage components, such as optical, magnetic, organic or other memory or disc storage, which can be integrated in whole or in part with the one or more processors 106. In some embodiments, the data storage 108 can be implemented using a single physical device (e.g., one optical, magnetic, organic or other memory or disc storage unit), while in other embodiments, the data storage 108 can be implemented using two or more physical devices. Further, in addition to the computer-readable program instructions 110, the data storage 108 may include additional data such as diagnostic data, among other possibilities. Further, the computing system 104 may also include one or more power source(s) 112 configured to supply power to various components of the computing system 104. Any type of power source may be used such as, for example, a battery.

FIG. 1 further depicts a subscriber device 114 positioned in the physical space 100. While the subscriber device 114 is shown as positioned in the physical space 100, the subscriber device 114 could also be positioned in another location, such as outside of the physical space 100 for instance. In either case, the subscriber device 114 may be any device capable of (directly or indirectly) subscribing to services provided by the computing system 104. In order to subscribe to services provided by the computing system 104, the subscriber device 114 could communicate with the computing system 104 via a communication link, such via a link taking the form of link 116 for instance. This link used by the subscriber device 114 to communicate with the computing system 104 may be the same as or may be different than the link 116 used by sensors 102 to communicate with the computing system 104. Moreover, in some cases, the subscriber device 114 could include at least some of the sensors 102 in the physical space 100.

The subscriber device 114 could take on one of various forms. For instance, the subscriber device 114 could be an electrical device, an electronic device, an electro-mechanical device, or a computing device, among others. By way of example, the subscriber device 114 may be any one of the following: television, speaker, projector, robotic system, cellular phone, laptop, tablet, desktop computer, wearable computing device, medical device, scanner, printer, pager, camera, calculator, oven, refrigerator, microwave, fan, or washing machine. Various other examples are also possible.

As noted, the subscriber device 114 can in some cases take the form of a computing device or could be communicatively linked to a separate computing device (not shown). In either case, this computing device may include a display and an Input Method Editor (IME), among other components. Such other component may include: processors, data storage, program instructions, and/or power sources, among others (e.g., all (or some) of which may take the same or similar form to components of computing system 104) By way of example, as noted, this computing device may take the form of a desktop computer, a laptop, a tablet, a wearable computing device, and/or a mobile phone, among other possibilities.

The display of the computing device may take on any form and may be arranged to project images and/or graphics to a user of the computing device. In an example arrangement, a projector within computing device may be configured to project various projections of images and/or graphics onto a surface of a display. The display may include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver may be disposed within the computing device for driving such a matrix display. Other arrangements may also be possible for display. As such, display may show a graphical user interface (GUI) that may provide an application through which the user may interact with the systems disclosed herein.

Additionally, the computing device may receive user-input (e.g., from the user of the computing device) via the IME. In particular, the IME may allow for interaction with the GUI such as for scrolling, providing text, and/or selecting various features of the application, among other possible interactions. The IME may take on various forms. In one example, the IME may be a pointing device such as a computing mouse used for control of the GUI. However, if display is a touch screen display, touch-input can be received (e.g., such as using a finger or a stylus) that allows for control of the GUI. In another example, the IME may be a text IME such as a keyboard that provides for selection of numbers, characters and/or symbols to be displayed via the GUI. For instance, in the arrangement where display is a touch screen display, portions the display may show the IME. Thus, touch-input on the portion of the display including the IME may result in user-input such as selection of specific numbers, characters, and/or symbols to be shown on the GUI via display. In yet another example, the IME may be a voice IME that receives audio input, such as from a user via a microphone of the computing device, that is then interpretable using one of various speech recognition techniques into one or more characters than may be shown via display. Other examples may also be possible.

III. ILLUSTRATIVE METHODS

Figure 2:
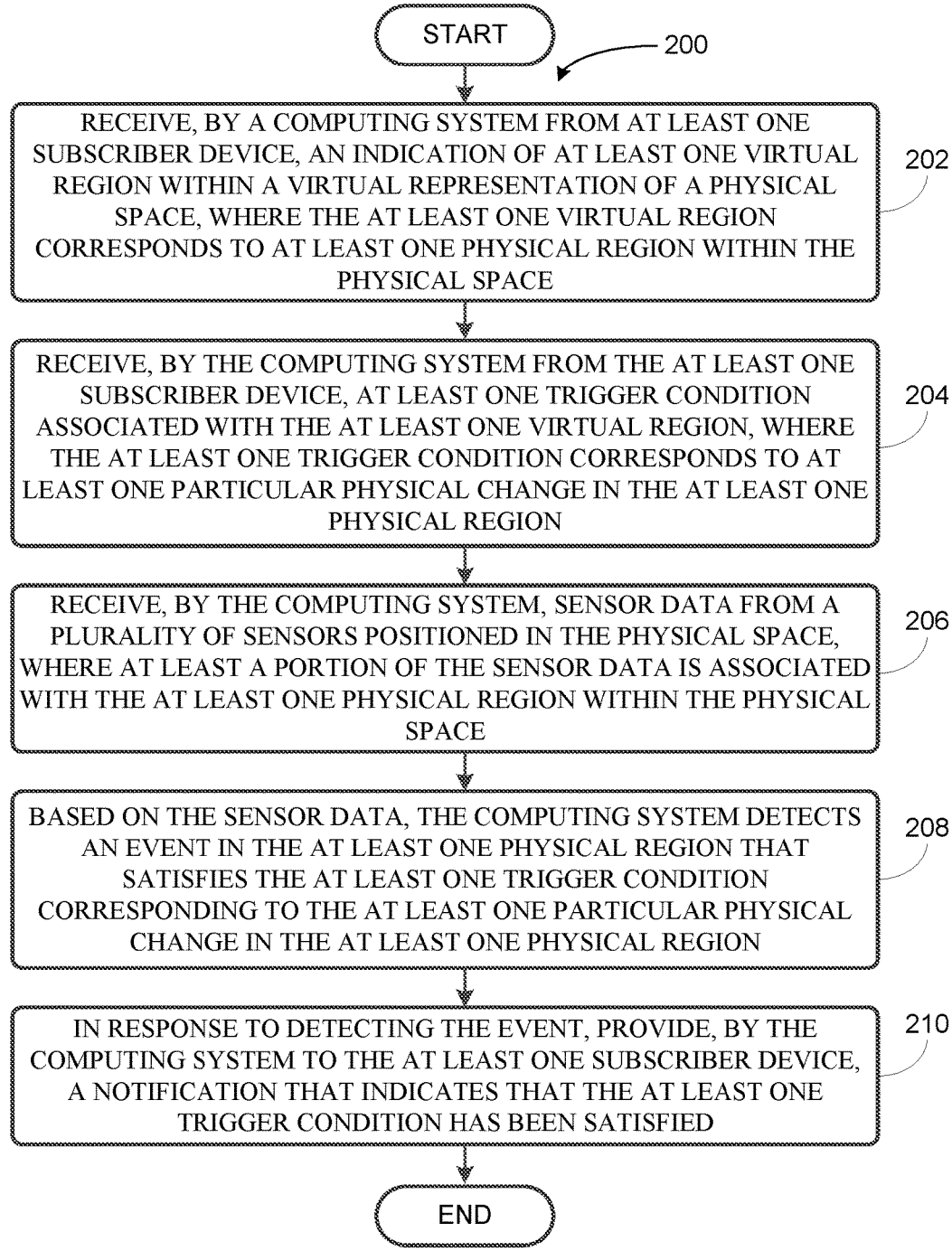
FIG. 2 is an example flowchart for detecting an event in a physical region of a physical space, according to an example implementation.

FIG. 2 is a flowchart illustrating a method 200, according to an example implementation. In particular, method 200 may be implemented to detect in a physical region an event that satisfies a trigger condition.

Method 200 shown in FIG. 2 (and other processes and methods disclosed herein) presents a method that can be implemented within an arrangement involving, for example, the computing system 104 and/or the subscriber device 114 described above in association with FIG. 1 (or more particularly by one or more components or subsystems thereof, such as by a processor and a non-transitory computer-readable medium having instructions that are executable to cause the device to perform functions described herein). Additionally or alternatively, method 200 may be implemented within any other arrangements and systems.

Method 200 and other processes and methods disclosed herein may include one or more operations, functions, or actions as illustrated by one or more of blocks 202-210. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry that is wired to perform the specific logical functions in the process.

At block 202, method 200 involves receiving, by a computing system (e.g., computing system 104) from at least one subscriber device (e.g., subscriber device 114), an indication of at least one virtual region within a virtual representation of a physical space (e.g., physical space 100), where the at least one virtual region corresponds to at least one physical region within the physical space.

In an example implementation, the subscriber device 114 may include an application that is capable of subscribing to the services provided by the computing system 104. For instance, the subscriber device 114 may be a speaker that has been programmatically equipped with the application (e.g., via engineering input, via a download, or via an installation). Alternatively, the subscriber device 114 may be communicatively linked to another computing device, such as a tablet, which includes this application. In this case, the computing device could use the application to subscribe the subscriber device 114 to the services provided by the computing system 104. For instance, the tablet may subscribe the speaker (e.g., based on user-input provided at the tablet) to the services provided by the computing system 104 and could cause the speaker to take actions based on outcomes of the services as further discussed below.

In either case, the application could subscribe to the services automatically. For instance, the application could subscribe when the subscriber device 114 encounters a particular device state that programmatically initiates a request for this subscription. Alternatively, the application could subscribe to the services in response to user-input provided by a user. Moreover, the application could subscribe to the services by sending to the computing system 104 a particular request that may include: identification (ID) of the subscriber device 114, capabilities the subscriber device 114, model of the subscriber device 114, a time of the request, and/or a time period for receiving the requested service, among others.

Accordingly, the request may include an indication of specific details related to the service. In particular, the request may include an indication of at least one virtual region within a virtual representation of the physical space 100. This virtual region may correspond to a physical region within the physical space 100, thereby allowing the subscriber device 114 (or a separate computing device) to essentially specify a physical region of interest for the subscriber device 114. Further, this virtual region may correspond to the physical region such as by corresponding to the relative location, size, shape, and/or relative orientation of the physical region for instance (among other possible attributes).

As such, the request could specify various characteristics related to the virtual region. These characteristics may include but are not limited to: (i) size of the at least one virtual region, (ii) shape of the at least one virtual region, (iii) relative location of the at least one virtual region within the virtual representation of the physical space, and (iv) relative orientation of the at least one virtual region within the virtual representation of the physical space. In this manner, the virtual region within the virtual representation may have attributes that match attributes of the physical region within the physical space 100.

Moreover, this physical region may be a physical subsection of the physical space 100. For instance, the physical region may be a two-dimensional (2D) sub-area of the physical space 100 that could take on any size and shape. If the physical space 100 is a three-dimensional (3D) space, the 2D sub-area could also take on any relative orientation within the 3D space. In this instance, the physical region could thus be a square, a rectangle, a circle, or a triangle, among other possible shapes. In other cases, this physical region may be a 3D sub-volume of the physical space 100 that could take on any relative location, size, shape, and/or relative orientation. For instance, the physical region could be a cube, a cuboid, a cylinder, a cone, a sphere, a pyramid, and/or a triangular prism, among other possible shapes. In yet other cases, the physical region may be a one-dimensional point within the physical space. Other cases are also possible.

Figure 3A:
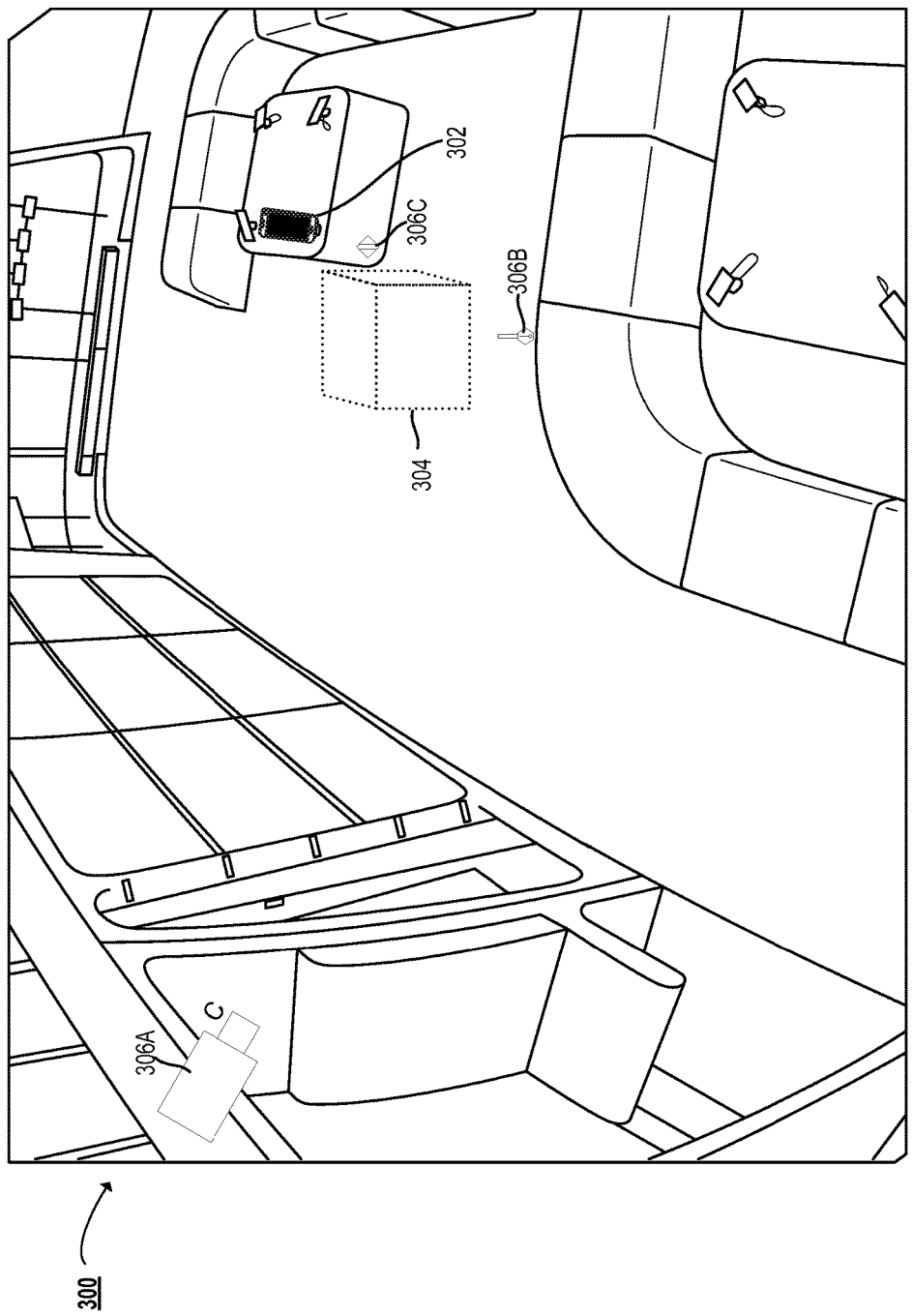
FIG. 3A to 3B illustrate an example physical region in an example physical space and example presence of an actor in the physical region, according to an example implementation.

FIG. 3A illustrates an example physical space 300 taking the form of a retail store. The physical space 300 is shown to include various devices, such as example subscriber device 302. Additionally, as shown in FIG. 3A, an example physical region 304 can take the form of a cube that is nearby the subscriber device 302. Further, the physical space 300 is shown to include example sensors 306A to 306B. In particular, sensor 306A may take the form of a depth sensor, sensor 306B may take the form of a heat sensor, and sensor 306C may take the form of a proximity sensor. Note that these sensors are shown for illustration purposes only and are not meant to be limiting because the physical space 300 may also include other types of sensors.

As further discussed below, the subscriber device 302 may define a virtual region corresponding to this physical region 304 so as to gain information related to events taking place nearby the subscriber device 302. In an example implementation, the virtual region could be defined (e.g., as part of the indication) in one of various ways. By way of example, the virtual representation may be a virtual coordinate system corresponding to a physical coordinate system of the physical space 100, such as by corresponding to the size, shape, and/or orientation of the physical space 100 for instance (among other possible attributes). In this example, the indication may specify virtual coordinates within the virtual coordinate system that may thus define the virtual region. With this arrangement, the virtual region can correspond to a physical region within the physical space 100. For instance, the specified virtual coordinates may correspond to physical coordinates within the physical coordinate system, such as by corresponding to the relative location, size, shape, and/or relative orientation of the physical region for instance (among other possible attributes).

In another example, a user could manually define the virtual region by way of interaction with the subscriber device 114 (e.g., if the device 114 is a computing device) or interaction with a separate computing device that can subscriber the device 114 to the services provided by the computing system 104. In either case, such a computing device may be configured to show a graphical user interface (GUI), such as via the above-mentioned application for instance. This GUI may provide for selection of a virtual region within a visual representation of the physical space 100. In one case, the GUI may show a (two-dimensional (2D) or three-dimensional (3D)) map of a physical space. In another case, the GUI may show a video feed of a physical location. In yet another case, the GUI may show an image of a physical space. In yet another case, the GUI may show a layout of a physical space, such as a layout extrapolated from a video feed or an image of the physical space. Other cases are also possible.

Within such an arrangement, user-input may be received corresponding to selection of a predefined region shown in the visual representation (e.g., an aisle within a retail space). However, arrangements are not limited to predefined regions as the GUI may also allow a user to define one or more regions for selection. For instance, the GUI may show a visual representation of a physical space and subsequent user-input may be received defining a custom region within the visual representation of the physical space. Defining the custom region may involve selection of a 2D or 3D shape (e.g., square or cube etc.) followed by user-input gestures to determine the position of the shape within the visual representation as well as size of the shape and orientation of the shape, thereby defining the selected region using the shape. These user-input gestures may involve using a pointing device (or using touch on a touch screen display) at a desired position on the map. Alternatively, rather than selecting a shape, user-input may involve a drawing of a custom shape (e.g., an enclosed area or volume) on the map to define the selected region. In either arrangement, the resulting selected region may be a 2D section of the physical space 100 or may be a 3D section of the physical space 100.

In yet another example, the subscriber device 114 may not define the virtual region as part of the request to the computing system 104. Rather, the computing system 104 may define the virtual region based on characteristics of the subscriber device 114 and/or based on characteristics of the request. For instance, as noted, the request may include specific device attributes such as ID of the subscriber device 114, capabilities the subscriber device 114, and/or model of the subscriber device 114. As further discussed below, the request may also specify a trigger condition defining a particular physical change within the physical region corresponding to the virtual region. As such, the computing system 104 may define the virtual region based on the specific device attributes and/or the specified trigger condition. To do so, the computing system 104 may refer to stored mapping data that maps various virtual regions to various the device attributes and/or various trigger condition, and may then select a virtual region based on this mapping.

By way of example, the subscriber device 114 may be a television and the trigger condition may involve presence of an actor (e.g., a person or a robot) within the physical region. The computing system 104 may receive the request including this information and may then refer to the mapping data in order to define a virtual region for the television. In this example, the virtual region may correspond to a physical region that takes on a cylindrical shape having a size corresponding to the size of the television and perhaps encompassing the television so as to determine presence of an actor within the physical region. Other examples are also possible.

In a further aspect, the above-mentioned request may specify a selection between the virtual region being a static virtual region or a dynamic virtual region. A static virtual region may define a region having coordinates that do not change over time relative to the coordinate system of the virtual representation. Hence, the static virtual region may correspond to a static physical region having coordinates that do not change over time relative to the coordinate system of the physical space 100. Whereas, a dynamic virtual region may define a region having coordinates that change over time relative to the coordinate system of the virtual representation. Hence, the dynamic virtual region may correspond to a dynamic physical region having coordinates that change over time relative to the coordinate system of the physical space 100.

In an example implementation, the dynamic physical region could be associated with movement of an actor from at least a first point of the physical space 100 to at least a second point of the physical space 100. In one case, the dynamic virtual region could simply take on any shape and may move relative to the virtual representation based on movements of the actor. In another case, the size, shape, and/or orientation (as well as other attributes) of the actor may substantially define the dynamic physical region. Hence, the size, shape, and/or orientation of the dynamic virtual region may adapt to the corresponding size, shape, and/or orientation of the actor as the moves throughout the physical space 100. For instance, the dynamic physical region may have a first shape while the one actor is at the first point and may have a second shape while the actor is at the second point. Accordingly, the dynamic virtual region may respectively takes on the first and second shapes while the actor is at the first and second points. In this manner, the first and second shapes can respectively correspond to shapes of the actor while the actor is at the first and second points. Other cases are also possible.

Further, the computing system 104 may use one of various techniques to generate the dynamic virtual region. As further discussed in detail below, the computing system 104 may receive sensor data from sensor positioned in the physical space 100. The computing system 104 may then use the sensor data to generate the dynamic virtual region over time. For instance, the computing system 104 may receive image data from a camera positioned in the physical space 100. The computing system 104 may then use various image processing techniques to (e.g., continuously or from time-to-time) determine a 2D outline or a 3D outline of the actor that can then be used as a basis to define the dynamic virtual region. Various other techniques are also possible.

Figure 4A:
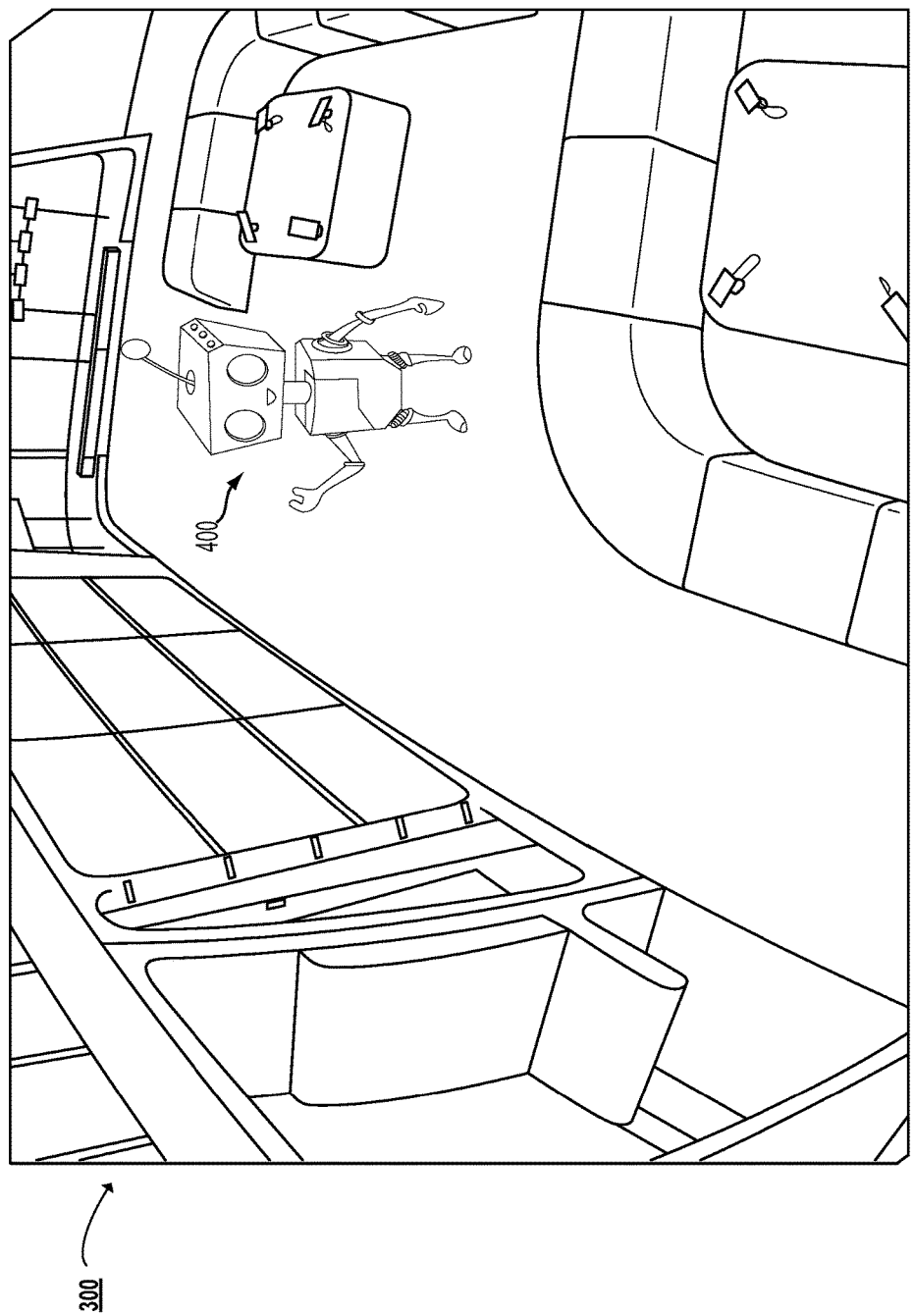
FIGS. 4A to 4D illustrate an example dynamic region, according to an example implementation.
Figure 4B:
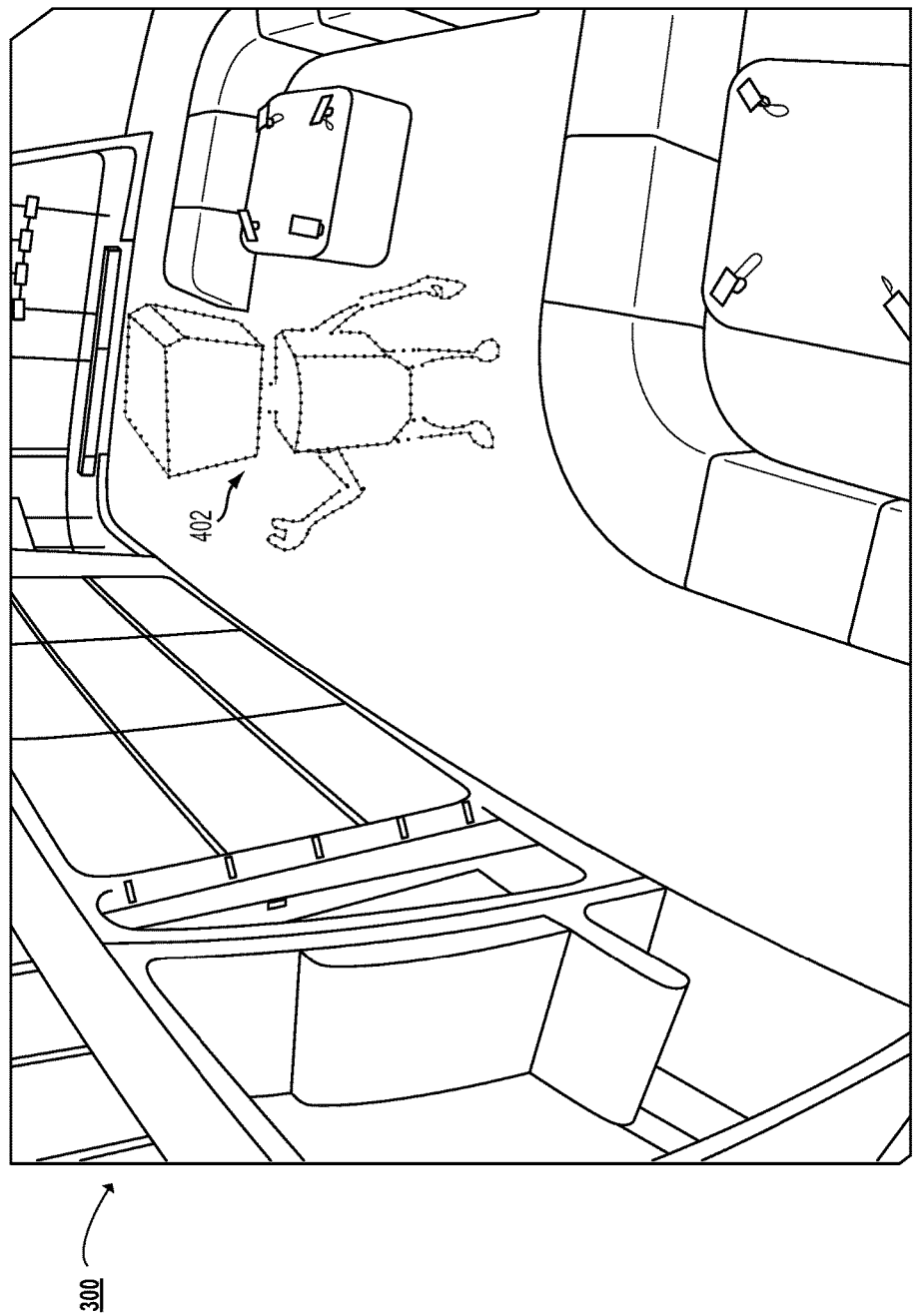
Figure 4C:
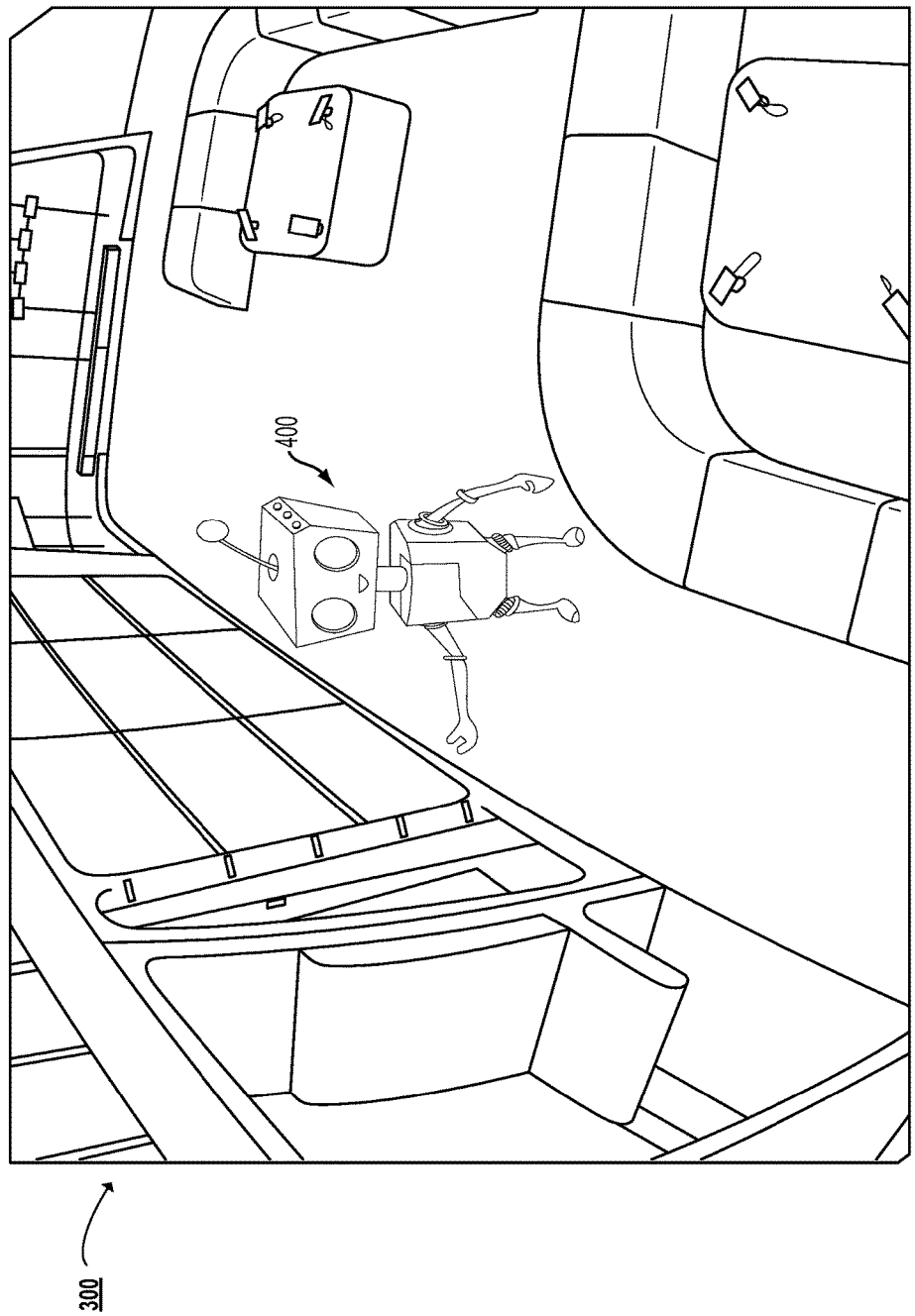
Figure 4D:
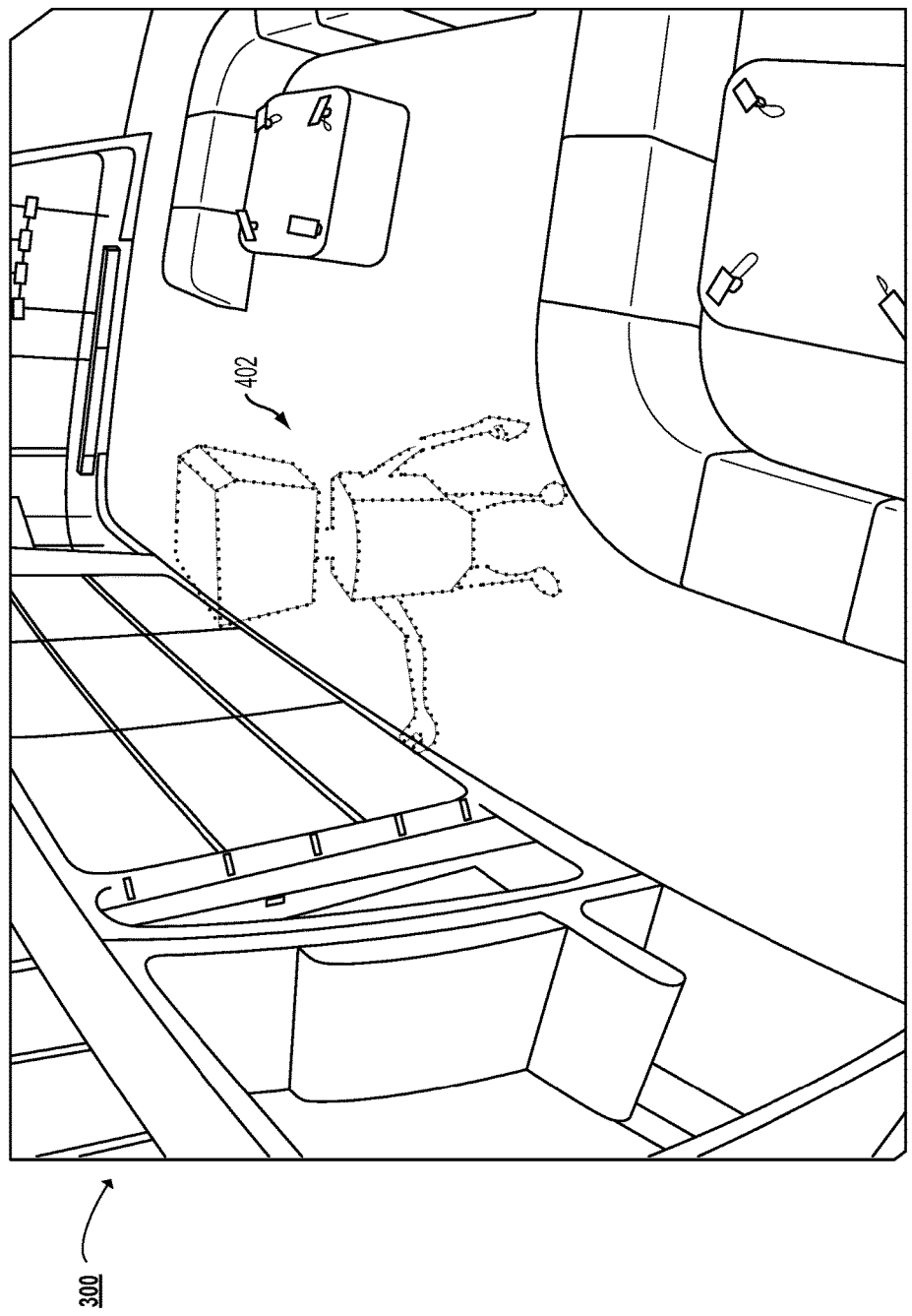

FIGS. 4A to 4D illustrate an example of a dynamic region taking on the location, shape, and orientation of an actor. As shown in FIG. 4A, an example actor 400 may take the form of a humanoid robot positioned at a first point/location in the physical space 300. FIG. 4B then shows an example dynamic region 402 that takes on the relative location, shape, and relative orientation (as well as other attributes) of the actor 400. However, this region 402 has a size that is larger than the size of the actor 400, so as to allow for detection of physical changes around the actor 400 for instance (as further discussed below). As shown in FIG. 4C, the example actor 400 has moved from the first point/position to a second point/location in the physical space 300. Also, the shape of the actor 400 has changed to a new shape due to movement of the arm of the humanoid robot. FIG. 4D then shows the example dynamic region 402 taking on the updated relative location, updated shape, and updated relative orientation (as well as other updated attributes) of the actor 400. However, as mentioned above, this region 402 still has a size that is larger than the size of the actor 400, so as to allow for detection of physical changes around the actor 400 in the updated location of the actor 400 for instance. Note that FIGS. 4A to 4D are shown for illustration purposes only and are not meant to be limiting.

Figure 5A:
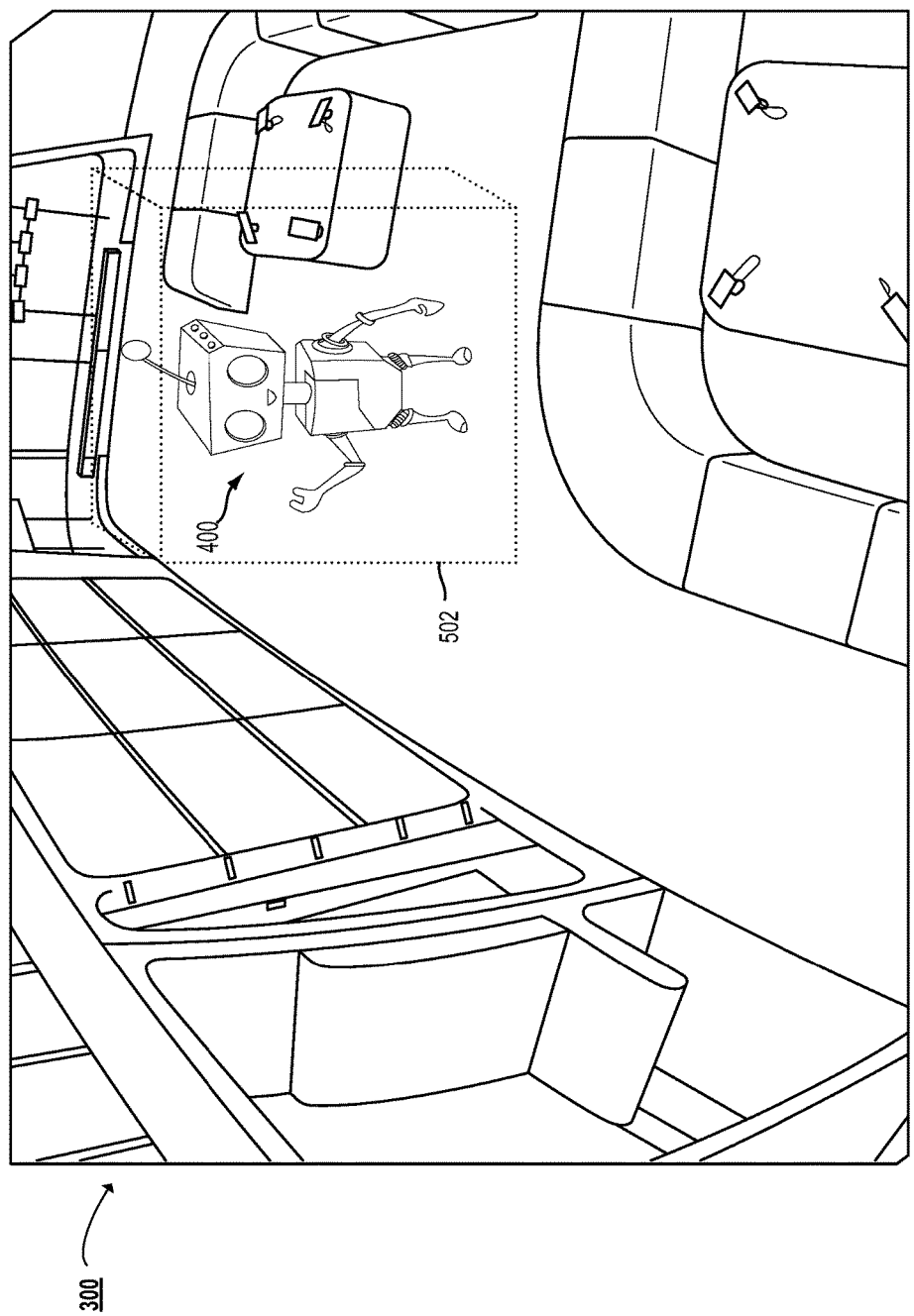
FIG. 5A to 5C illustrate another example dynamic region and example presence of an actor in the dynamic physical region, according to an example implementation.
Figure 5B:
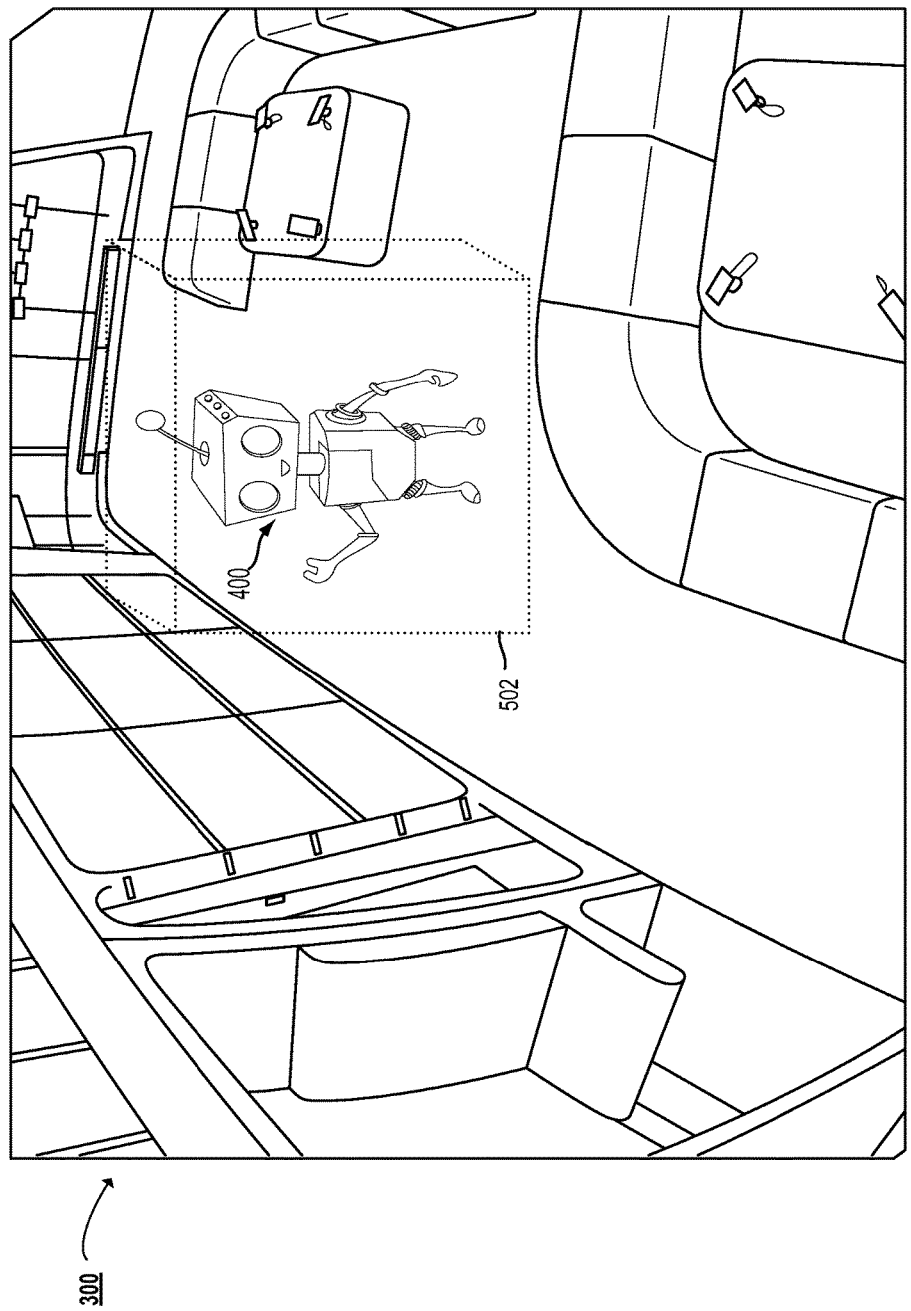

FIGS. 5A to 5B illustrate an example of a dynamic region taking on a relatively simple shape and moving based on movements of the actor 400. As shown in FIG. 5A, an example actor 400 may take the form of a humanoid robot positioned at a first point/location in the physical space 300. FIG. 5A then shows an example dynamic region 502 that takes a 3D rectangular shape that surrounds the actor 400. This region 502 has a size that is larger than the size of the actor 400, so as to allow for detection of physical changes around the actor 400 for instance (as further discussed below). As shown in FIG. 5B, the example actor 400 has moved from the first point/position to a second point/location in the physical space 300. FIG. 5B then shows the example dynamic region 502 moving to the updated relative location of the actor 400. As shown, this region 502 still has a size that is larger than the size of the actor 400, so as to allow for detection of physical changes around the actor 400 in the updated location of the actor 400 for instance. Note that FIGS. 5A to 5B are shown for illustration purposes only and are not meant to be limiting.

Referring back to FIG. 2, at block 204, method 200 involves receiving, by the computing system from the at least one subscriber device, at least one trigger condition associated with the at least one virtual region, where the at least one trigger condition corresponds to at least one particular physical change in the at least one physical region.

In an example implementation, the above-mentioned request may specify a trigger condition that is associated with the virtual region corresponding to the physical region. This trigger condition may correspond to a particular physical change. A physical change may define any occurrence in the physical region that is perceptible by the sensors in the physical space. Accordingly, subscriber device 114 may subscribe to receive a notification (as further discussed below) when a particular physical change occurs in the physical region and may do so by defining the trigger condition that specifies this particular physical change.

By way of example, the particular physical change may involve entry of an actor into the physical region. This may specifically involve detection that the actor enters some portion (e.g., the volume or area) of the physical region. In another example, the particular physical change may involve exit of an actor from the physical region. This may specifically involve detection that the actor exits some portion (e.g., the volume or area) of the physical region. In yet another example, the particular physical change may involve presence of an actor in the at least one physical region. This may specifically involve detection that the actor is present at some portion (e.g., the volume or area) of the physical region for at least a threshold time period. In yet another example, the particular physical change may involve occupancy of the physical region. This may specifically involve presence of at least a threshold number of actors in the physical region.

In yet another example, the particular physical change may involve a particular sound in the at least one physical region. For instance, this particular sound may be a sound of an adult human. This may specifically involve the use of audio data received from directional microphones so as to determine location of the sound and subsequent determination that the sound comes from the physical region at issue. Within this example, the particular physical change may involve the sound including a particular phrase (e.g., "hello") in the at least one physical region. Various speech recognition techniques may be used by the computing system 104 so as to determine that a phrase matches the particular phrase specified in the trigger condition. Other examples are also possible.

The trigger condition could be specified in one of various ways. For example, the request may include a code corresponding to the trigger condition. In this example, the computing system 104 could refer to stored mapping data that maps codes to various particular physical changes and the computing system 104 could thus interpret the trigger condition by determining the particular physical change corresponding to a specified code. In another example, the request may include one or more characters (e.g., received via user-input) that specify the particular physical change (e.g., "ENTRY OF ACTOR"). In this example, the computing system 104 may use various natural language processing (NLP) techniques so as to interpret the request and thus determine the particular physical change. Other examples are also possible.

Referring back to FIG. 2, at block 206, method 200 involves receiving, by the computing system, sensor data from a plurality of sensors (e.g., sensors 102) positioned in the physical space, where at least a portion of the sensor data is associated with the at least one physical region within the physical space.

In an example implementation, the computing system 104 may receive the sensor data in the form of computer-readable data packets, among other possible forms. Additionally, the computing system 104 may receive data from each sensor separately or may receive data from two or more sensors concurrently (e.g., such as within the same data packet). Further, the sensor data may be received continuously (e.g., in real-time) or may be received from time-to-time (e.g., periodically). Yet further, the sensor data may be received in the form of anonymized data streams. That is, sensor data representing information related to one or more entities (e.g. individuals) located within the physical space 100 may not provide any information related to respective individual identities of the one or more entities, thereby maintaining privacy of individuals located within the physical space 100.

Once the sensor data is received, some or all of the sensor data may be stored in data storage 108 and/or processed (e.g., using processors 106) to provide the functionality discussed herein. Additionally, the computing system 104 may store a time related to the received sensor data. For instance, the computing system 104 may use various time stamping techniques to establish a time that the sensor data is obtained by the sensors, a time that the sensor data (e.g., a data packet) is sent to the computing system 104, and/or a time that sensor data (e.g., a data packet) is received by the computing system 104, among others. This time may include a date, a day of the week, and/or a time of the day, among other possibilities.

Further, the computing system 104 may additionally or alternatively store a location related to the sensor data. For instance, the computing system 104 may encode location information onto the received data packets (e.g., receiving sensor identification information and determining a corresponding stored location of the identified sensor). Alternatively, the received data packets may already have the location information encoded thereon. In either case, the location information may be in the form of coordinates within the physical space 100, an address, and/or a list of characters representing a name (e.g., a name of a department within a retail space), among other possibilities.

Moreover, this location information may represent the location within a physical space 100 of a particular sensor (or a set of sensors). However, in some cases, the received sensor data may provide information related to a location within the physical space 100 that is not necessarily the same as the location of the sensor obtaining this sensor data. Thus, the location information may additionally or alternatively represent the location within the physical space 100 that the received sensor data is associated with. As an example, the sensor data may include image data received from a camera located within the physical space. In this example, the location information may include the location of the camera within the physical space and/or may include a location associated with the image data provided by the camera. Other examples may also be possible.

Referring back to FIG. 2, at block 208, method 200 involves, based on the sensor data, the computing system detecting an event in the at least one physical region that satisfies the at least one trigger condition corresponding to the at least one particular physical change in the at least one physical region.

In an example implementation, the computing system 104 may use the received sensor data to detect an event in the physical region that satisfied the trigger condition. This event may define a physical change in the physical region that has been detected by one or more sensors. Hence, detecting the event may involve a determination that at least part of the received sensor data includes data that represents the event. To determine that the event satisfies the trigger condition, the computing system 104 may determine that the part of the received sensor data that includes data representing event matches (or at least substantially matches) data that defines the trigger condition.

In particular, once the computing system 104 receives the indication of the virtual region and the trigger condition, the computing system 104 may determine at least one approach (can also be referred to as a sensor interpretation rule) for detecting the event in the physical region that satisfies the trigger condition. Once the approach has been determined, the computing system 104 may then detect the event based on the approach. In a situation where two or more approaches are determined, the computing system 104 may use any one of the determined approaches to detect the event. In either case, such an approach could be determined in one of various ways.

In an example arrangement, the computing system 104 may determine the approach based on characteristics of one or more of the plurality of sensors 102 positioned in the physical space 100. More specifically, the computing system 104 may have stored thereon (e.g., in data storage 108) or could otherwise refer to information related to sensors positioned in a particular physical space. This information may include characteristics of various sensors and these characteristics may be considered when determining the approach.

In one case, a sensor characteristic may involve the sensor type, such as whether the sensor is a position sensor or a heat sensor for instance. In another case, a sensor characteristic may involve the sensor manufacturer and/or model, such as a company name and/or a product name for instance. In yet another case, a sensor characteristic may involve sensor location, such as based on the above-mentioned location information for instance. In yet another case, a sensor characteristic may involve sensor orientation, such as relative orientation of the sensor in the physical space 100 for instance. In yet another case, a sensor characteristic may involve sensor association with the physical region. For instance, the computing system 104 may determine that location information associated with the sensor corresponds to coordinates of the physical region. In yet another case, a sensor characteristic may involve sensor association with the subscriber device 114. For instance, the computing system 104 may determine that the sensor is part of the subscriber device 114. Other cases are also possible.

Accordingly, in one aspect, determining the approach may involve selecting one or more particular sensors (e.g., from among the plurality of sensors 102 in the physical space 100) to use in detecting the event. Selecting the one or more particular sensors may involve selecting one or more sensors having characteristics most suitable for detecting the event. For instance, if the trigger condition involves detecting entry of an actor into the region, the computing system 104 may determine that the most suitable sensors would involve a combination of an image capture device associated with the physical region and a proximity sensor associated with the physical region.

As such, selecting one or more particular sensors may involve the computing system 104 selecting at least (i) a first sensor configured to generate first sensor data and (ii) a second sensor configured to generate second sensor data. The computing system 104 can then make a decision to use at least the first and second sensor data for detecting the event. Upon this decision, the computing system 104 may detect the particular physical change in the physical region based on evaluation of at least the first and second sensor data. If this first and second sensor data matches (or at least substantially matches) data that defines the trigger condition, then the computing system 104 can determine that the event has been detected.

In another aspect, determining the approach may involve determining the portion of the sensor data that is associated with the physical region within the physical space. To do so, for example, the computing system 104 may determine that the above-mentioned location information for a data packet corresponds to coordinates of the physical region and may responsively denote the data packet (e.g., encode thereon) as being associated with the physical region. In another example, the computing system 104 could directly determine what portion of the sensor data corresponds to the physical region. For instance, the computing system 104 may receive from a depth sensor a plurality of depth points and may then use coordinates of the depth points to determine which of the depth points correspond with the physical region. With these arrangements, the computing system 104 may detect the event by detecting the particular physical change in the physical region based on evaluation of the portion of the sensor data that is associated with the physical region, such as based on evaluation of data packets that have been denoted as being associated with the physical region.

In yet another aspect, determining the approach may involve determining data that defines the trigger condition. In particular, the computing system 104 may determine the information (e.g., values) within the sensor data that would represent the particular physical change and thus the trigger condition. Hence, this information may amount to information that the computing system 104 should look for within the sensor data so as to detect the event. The computing system 104 can determine the information in one of various ways.

In one case, determining this information may be based on contents included in the above-mentioned request. For instance, the request may specify values and/or thresholds (e.g., for one or more particular sensors) that define the trigger condition and the computing system 104 may then determine, as the sensor data is received, whether the sensor data includes these specified values and/or values exceeding specified thresholds. By way of example, the request may include a trigger condition specifying that the computing system 104 should inform the subscriber device 114 when a temperature in the physical region exceeds one hundred degrees Fahrenheit. In this example, the computing system 104 may then determine, as the sensor data is received, whether the sensor data includes data corresponding to a temperature in the physical region that exceeds one hundred degrees Fahrenheit.

In another case, this information may be inferred based on contents in the above-mentioned request. For instance, the request may not specify values and/or thresholds but may rather define the trigger condition in another way, such as by way of a code or language specifying the condition for example. The computing system 104 may then use mapping data or other processing techniques to determine values and/or thresholds that correspond to the trigger condition. The computing system 104 may then determine, as the sensor data is received, whether the sensor data includes these values and/or values exceeding thresholds.

By way of example, the request may include a trigger condition specifying that the computing system 104 should inform the subscriber device 114 when the physical region gets "hot". The trigger condition may specify this by way of text (e.g., "let me know when this region is hot"), such as text provided via user-input. In this example, the computing system 104 could use NLP techniques to determine the meaning of the request and may then determine (e.g., based on mapping data) that a "hot" region may involve temperature in the physical region exceeding one hundred degrees Fahrenheit. Hence, the computing system 104 may determine that the trigger condition would be satisfied if the temperature in the physical region exceeds one hundred degrees Fahrenheit. As such, the computing system 104 may then determine, as the sensor data is received, whether the sensor data includes data corresponding to a temperature in the physical region that exceeds one hundred degrees Fahrenheit.

In yet another aspect, determining the approach may involve determining a weight for data received from each sensor that is used for detecting the event. Additionally or alternatively, determining the approach may involve determining a weight for each portion of the sensor data that is used for detecting the event. For example, the computing system 104 may determine that a temperature sensor and a position sensor should be used to detect an event. In this example, the computing system 104 may determine a first weight for sensor data received from the temperature sensor and a second weight for sensor data received from the position sensor. The computing system 104 may then apply the respective weights to the respective sensor data, such as by determining a weighted average for instance. Thus, the computing system 104 may detect the event based on values resulting from applying different weights to different sensor data. For instance, the computing system 104 may determine the weighted average and may then determine whether the value of the weighted average exceeds a threshold value, so as to detect the event. Other aspects (as well as combinations of the above aspects) are also possible.

Referring back to FIG. 2, at block 210, method 200 involves, in response to detecting the event, providing, by the computing system to the at least one subscriber device, a notification that indicates that the at least one trigger condition has been satisfied.

In an example implementation, the computing system 104 may notify the subscriber device 114 that the event has been detected and thus that the trigger condition has been satisfied. The computing system 104 may do so by transmitting to the subscriber device 114 a notification indicating so. For instance, the notification may include a binary value (e.g., one (1)), a code, and/or text that indicate that the trigger condition has been satisfied. In some cases, the notification could also include other information such as a time that trigger condition has been satisfied, among other possibilities.

Figure 3B:
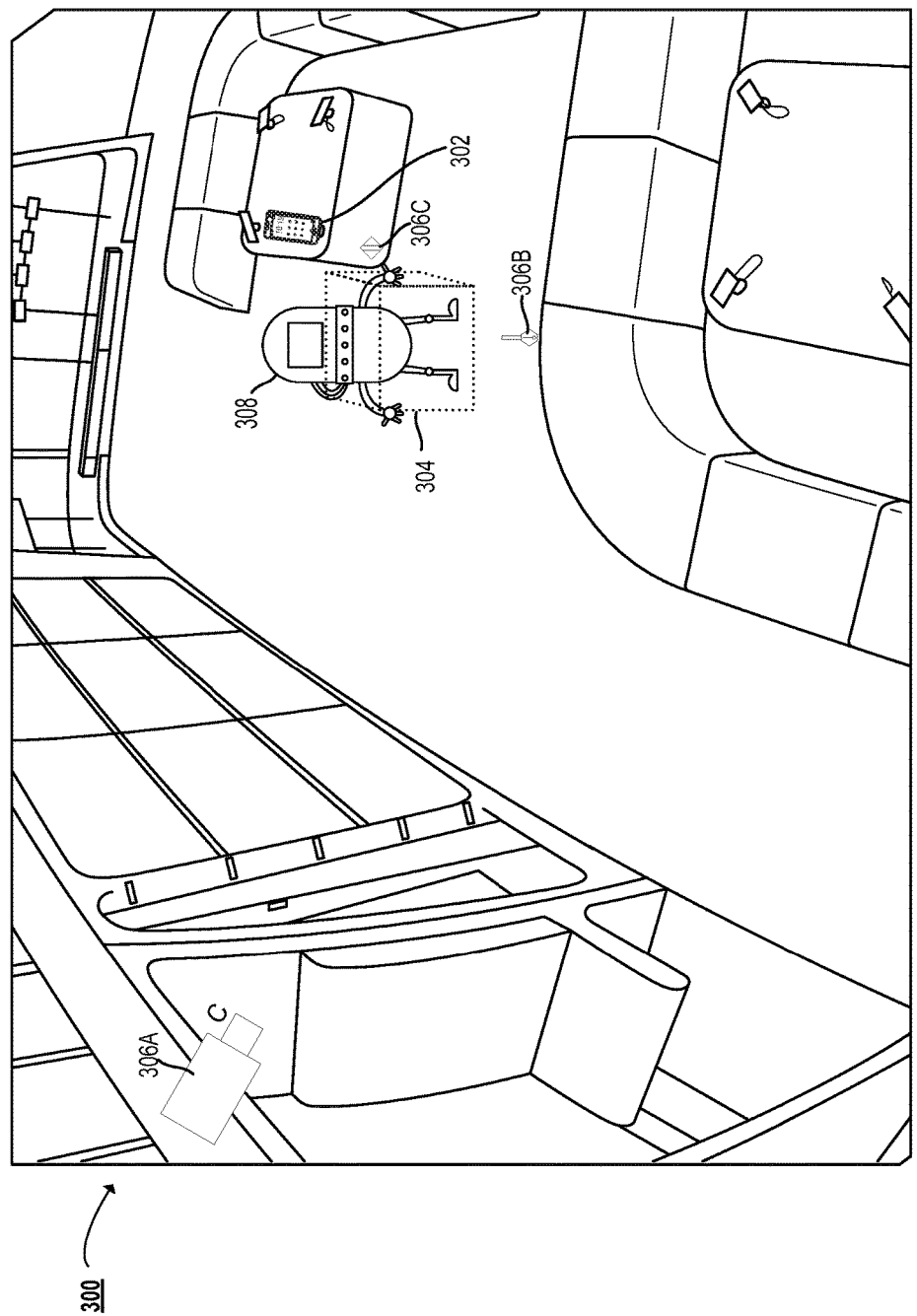

Once the subscriber device 114 receives the notification, the subscriber device 114 may take one of various actions. To present such example actions, refer to FIGS. 3B and 5C each illustrating an actor interacting with a region. For example, FIG. 3B illustrates an actor 308 positioned in the physical region 304. In this example, the subscriber device 302 may have specified the trigger condition as being presence of an actor in the physical region 304. Based on this trigger condition, the computing system 104 may determine presence of the actor 308 in the physical region 304 (e.g., using one or more of the sensors 306A to 306C) and may then notify the subscriber device 302 that the trigger condition has been satisfied. In response to this notification, the subscriber device 302 could take one of various actions. For instance, the subscriber device 302 may update content being displayed by the subscriber device 302. As shown in FIG. 3B, this may involve the subscriber device 302 turning on the display of the device 302 so as to display the lock screen including a current time of the day, among other possibilities. In another instance, the subscriber device 302 could increment a counter each time a notification is received (and thus each time an actor is present in the region 304). The subscriber device 302 could do so to determine a total number of actors present in the region over a span of a day for example. Other instances are also possible.

Figure 5C:
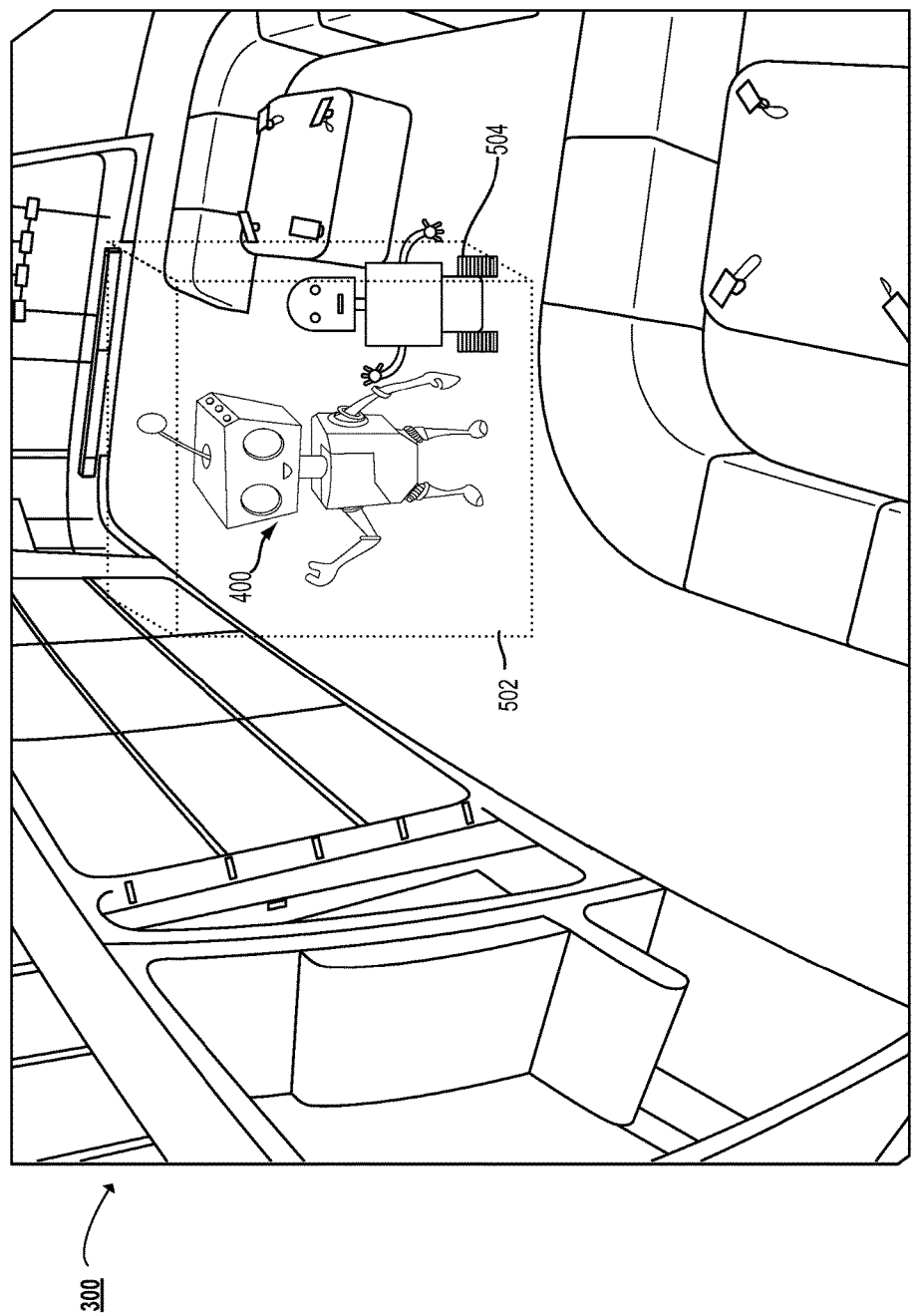

In another example, FIG. 5C illustrates an actor 504 (taking the form of a robot) positioned in the dynamic region 402 (and thus nearby the actor 400). In this example, the actor 400 (also taking the form of a robot) may be the subscriber device and thus may have specified the trigger condition as being presence of another actor in the dynamic region 402. Based on this trigger condition, the computing system 104 may determine presence of the actor 504 in the dynamic region 402. Once the computing system 104 determines presence of the actor 504 in the dynamic region 402, the computing system 104 may then notify the actor 400 that the trigger condition has been satisfied. In response to this notification, the actor 400 could take one of various actions. For instance, the actor 400 taking the form of the robot could cause the robot to shut down or to stop moving, so as to decrease the risk of collision with the actor 504 and to thus increase safety in the robot's surroundings. Other examples are also possible.

IV. ADDITIONAL FEATURES

In a further aspect, the above implementations could be carried out in the context of multiple regions. For instance, the request may specify two or more virtual regions. In this instance, the trigger condition for each region may be the same. Additionally or alternatively, trigger conditions for each region may be different. With this arrangement, the computing system 104 may notify the subscriber device 114 when all trigger conditions for the various specified regions have been satisfied. In another case, the computing system 104 may notify the subscriber device 114 when at least one trigger condition for at least one region has been. In some cases, the request may specify an order at which the trigger conditions should be satisfied. For example, the request may specify that trigger condition A for region A should be satisfied followed by trigger condition B for region B being satisfied. Thus, when the computing system 104 detects events occurring in this order, the computing system 104 may notify the subscriber device 114. Other cases are also possible.

In yet a further aspect, the above implementations could be carried out in the context of multiple trigger conditions for a specified region. For instance, the request may specify two or more trigger conditions for a specified region. In this instance, the trigger conditions for the region may be different relative to one another. With this arrangement, the computing system 104 may notify the subscriber device 114 when all trigger conditions for the specified region have been satisfied. In another case, the computing system 104 may notify the subscriber device 114 when at least one trigger condition for the specified region has been satisfied. In some cases, the request may specify an order at which the trigger conditions should be satisfied for the specified region. For example, the request may specify that trigger condition A for region A should be satisfied followed by trigger condition B for region A being satisfied. Thus, when the computing system 104 detects events occurring in this order within the specified region, the computing system 104 may notify the subscriber device 114. Other cases are also possible.

In yet a further aspect, a virtual region could be defined based on a gaze direction of an actor. In particular, the computing system 104 may use sensor data to determine a gaze direction of an actor and may then use this gaze direction to define the region. For instance, the computing system 104 may define the region based on the field of view of the actor, such as by defining the region as a focal point of the field of view of the actor for example. In this regard, this defined region may be dynamic and may thus update based on the changing gaze direction of the actor. Other aspects are also possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

In situations in which the systems collect information about entities, or make use of that information, data may be treated in one or more ways before it is stored or used, so that personally identifiable information is removed. For example, an entity's identity may be treated so that no personally identifiable information can be determined for the entity, or an entity's geographic location may be generalized where location information is obtained (such as to a city, ZIP code, or state level), so that a particular location of an entity cannot be determined.

We claim:

1. A method comprising:

receiving, by a computing system from a subscriber device as part of a service that the computing system provides to the subscriber device, (i) an indication of a virtual region within a virtual representation of a physical space and (ii) a trigger condition associated with the virtual region, wherein the virtual region corresponds to a physical region within the physical space, wherein the trigger condition corresponds to a particular physical change in the physical region, wherein the subscriber device contains program code that enables (i) transmission of the indication and the trigger condition to the computing system and (ii) subsequent receipt, from the computing system, of a notification that indicates that the trigger condition has been satisfied, wherein the subscriber device does not contain program code that enables use of sensor data as basis for detecting an event in the physical region that satisfies the trigger condition, and wherein the computing system providing the service comprises the computing system providing a programming building block that enables the subscriber device to cause the computing system to (i) receive, on behalf of the subscriber device, the sensor data from the plurality of sensors and (ii) detect, on behalf of the subscriber device, the event in the physical region that satisfies the trigger condition;

receiving, by the computing system, the sensor data from a plurality of sensors positioned in the physical space, wherein the plurality of sensors are external to the subscriber device, and wherein at least a portion of the sensor data is associated with the physical region within the physical space; and based on the sensor data and as part of the service, the computing system detecting, on behalf of the subscriber device, the event in the physical region that satisfies the trigger condition corresponding to the particular physical change in the physical region, and responsively providing, to the subscriber device from which the indication of the virtual region and the trigger condition were received, the notification that indicates that the trigger condition has been satisfied.

2. The method of claim 1, wherein the virtual region corresponding to the physical region within the physical space comprises the virtual region corresponding to a three-dimensional (3D) sub-volume of the physical space.

3. The method of claim 1, wherein receiving the indication of the virtual region comprises receiving characteristics of the virtual region, and wherein the characteristics comprise one or more of: (i) size of the virtual region, (ii) shape of the virtual region, (iii) relative location of the virtual region within the virtual representation of the physical space, (iv) relative orientation of the virtual region within the virtual representation of the physical space, and (v) a selection between the virtual region being a static virtual region or a dynamic virtual region.

4. The method of claim 1, wherein the physical region comprises a dynamic physical region that is associated with movement of an actor from at least a first point of the physical space to at least a second point of the physical space, and wherein the virtual region comprises a dynamic virtual region that corresponds to the dynamic physical region.

5. The method of claim 4, wherein the dynamic physical region has (i) a first shape while the actor is at the first point and (ii) a second shape while the actor is at the second point, and wherein the dynamic virtual region respectively takes on the first and second shapes while the actor is at the first and second points.

6. The method of claim 5, wherein the first and second shapes respectively correspond to particular shapes of the actor while the actor is at the first and second points.

7. The method of claim 1, further comprising:

in response to receiving the indication of the virtual region and the trigger condition, determining at least one sensor interpretation rule for detecting the event in the physical region that satisfies the trigger condition, wherein detecting the event comprises detecting the event based at least in part on the at least one sensor interpretation rule.

8. The method of claim 7, wherein determining the at least one sensor interpretation rule comprises determining the at least one sensor interpretation rule based at least in part on characteristics of one or more of the plurality of sensors positioned in the physical space.

9. The method of claim 8, wherein the characteristics comprise one or more of: (i) sensor types, (ii) sensor models, (iii) sensor locations, (iv) sensor orientations, and (v) sensor association with the physical region.

10. The method of claim 7, wherein determining the at least one sensor interpretation rule comprises selecting one or more particular sensors, from among the plurality of sensors, to use in detecting the event.

11. The method of claim 10, wherein selecting one or more particular sensors comprises selecting at least (i) a first sensor configured to generate first sensor data and (ii) a second sensor configured to generate second sensor data, wherein determining the at least one sensor interpretation rule further comprises making a decision to use at least the first and second sensor data for detecting the event, and wherein detecting the event based at least in part on the at least one sensor interpretation rule comprises detecting the particular physical change in the physical region based on evaluation of at least the first and second sensor data.

12. The method of claim 7, wherein determining at least one sensor interpretation rule comprises determining the portion of the sensor data that is associated with the physical region within the physical space, and wherein detecting the event based at least in part on the at least one sensor interpretation rule comprises detecting the particular physical change in the physical region based on evaluation of the portion of the sensor data.

13. The method of claim 1, wherein the particular physical change comprises one or more of:
(i) entry of at least one actor into the physical region,
(ii) exit of the at least one actor from the physical region,
(iii) presence of the at least one actor in the physical region, and
(iv) occupancy of the physical region, wherein the occupancy corresponds to presence of at least a threshold number of actors in the physical region.

14. The method of claim 1, wherein the particular physical change comprises one or more of:
(i) a particular sound in the physical region, and
(ii) a particular phrase in the physical region.

15. The method of claim 1, wherein the subscriber device also does not contain program code that enables receipt of the sensor data from the plurality of sensors positioned in the physical space.

16. A computing system comprising:
one or more processors;
a non-transitory computer readable medium; and
program instructions stored on the non-transitory computer readable medium and executable by the one or more processors to:
receive, from a subscriber device as part of a service that the computing system provides to the subscriber device, (i) an indication of a virtual region within a virtual representation of a physical space and (ii) a trigger condition associated with the virtual region, wherein the virtual region corresponds to a physical region within the physical space, wherein the trigger condition corresponds to a particular physical change in the physical region, wherein the subscriber device contains program code that enables (i) transmission of the indication and the trigger condition to the computing system and (ii) subsequent receipt, from the computing system, of a notification that indicates that the trigger condition has been satisfied, wherein the subscriber device does not contain program code that enables use of sensor data as basis for detecting an event in the physical region that satisfies the trigger condition, and wherein the computing system providing the service comprises the computing system providing a programming building block that enables the subscriber device to cause the computing system to (i) receive, on behalf of the subscriber device, the sensor data from the plurality of sensors and (ii) detect, on behalf of the subscriber device, the event in the physical region that satisfies the trigger condition;
receive the sensor data from a plurality of sensors positioned in the physical space, wherein the plurality of sensors are external to the subscriber device, and wherein at least a portion of the sensor data is associated with the physical region within the physical space; and
based on the sensor data and as part of the service, detect, on behalf of the subscriber device, the event in the physical region that satisfies the trigger condition corresponding to the particular physical change in the physical region and responsively provide, to the subscriber device from which the indication of the virtual region and the trigger condition were received, the notification that indicates that the trigger condition has been satisfied.

17. The computing system of claim 16, wherein the physical region comprises a dynamic physical region that is associated with movement of an actor from at least a first point of the physical space to at least a second point of the physical space, and wherein the virtual region comprises a dynamic virtual region that corresponds to the dynamic physical region.

18. The computing system of claim 17, wherein the dynamic physical region has (i) a first shape while the actor is at the first point and (ii) a second shape while the actor is at the second point, wherein the dynamic virtual region respectively takes on the first and second shapes while the actor is at the first and second points, and wherein the first and second shapes respectively correspond to particular shapes of the actor while the actor is at the first and second points.

19. A non-transitory computer readable medium having stored therein instructions executable by one or more processors to cause a computing system to perform functions comprising:
receiving, from a subscriber device as part of a service that the computing system provides to the subscriber device, (i) an indication of a virtual region within a virtual representation of a physical space and (ii) a trigger condition associated with the virtual region, wherein the virtual region corresponds to a physical region within the physical space, wherein the trigger condition corresponds to a particular physical change in the physical region, wherein the subscriber device contains program code that enables (i) transmission of the indication and the trigger condition to the computing system and (ii) subsequent receipt, from the computing system, of a notification that indicates that the trigger condition has been satisfied, wherein the subscriber device does not contain program code that enables use of sensor data as basis for detecting an event in the physical region that satisfies the trigger condition, and wherein the computing system providing the service comprises the computing system providing a programming building block that enables the subscriber device to cause the computing system to (i) receive, on behalf of the subscriber device, the sensor data from the plurality of sensors and (ii) detect, on behalf of the subscriber device, the event in the physical region that satisfies the trigger condition;
receiving the sensor data from a plurality of sensors positioned in the physical space, wherein the plurality of sensors are external to the subscriber device, and wherein at least a portion of the sensor data is associated with the at least one physical region within the physical space; and based on the sensor data and as part of the service, detecting, on behalf of the subscriber device, the event in the physical region that satisfies the trigger condition corresponding to the particular physical change in the physical region and responsively providing, to the subscriber device from which the indication of the virtual region and the trigger condition were received, the notification that indicates that the trigger condition has been satisfied.

20. The non-transitory computer readable medium of claim 19, the functions further comprising:

in response to receiving the indication of the virtual region and the trigger condition, determining at least one sensor interpretation rule for detecting the event in the physical region that satisfies the trigger condition, wherein determining the at least one sensor interpretation rule comprises determining the at least one sensor interpretation rule based at least in part on characteristics of one or more of the plurality of sensors positioned in the physical space, and wherein detecting the event comprises detecting the event based at least in part on the at least one sensor interpretation rule.

21. The non-transitory computer readable medium of claim 20, wherein determining the at least one sensor interpretation rule comprises (a) selecting at least (i) a first sensor configured to generate first sensor data and (ii) a second sensor configured to generate second sensor data and (b) making a decision to use at least the first and second sensor data for detecting the event, and wherein detecting the event based at least in part on the at least one sensor interpretation rule comprises detecting the particular physical change in the physical region based on evaluation of at least the first and second sensor data.

22. The non-transitory computer readable medium of claim 20, wherein determining at least one sensor interpretation rule comprises determining the portion of the sensor data that is associated with the physical region within the physical space, and wherein detecting the event based at least in part on the at least one sensor interpretation rule comprises detecting the particular physical change in the physical region based on evaluation of the portion of the sensor data.

\* \* \* \* \*